United States Patent
Lu

(10) Patent No.: US 12,476,839 B2
(45) Date of Patent: *Nov. 18, 2025

(54) INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventor: Shuhan Lu, Shanghai (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,493

(22) Filed: Jan. 24, 2024

(65) Prior Publication Data

US 2024/0171420 A1    May 23, 2024

Related U.S. Application Data

(63) Continuation of application No. 17/877,984, filed on Jul. 31, 2022, now Pat. No. 11,902,039, which is a (Continued)

(30) Foreign Application Priority Data

Apr. 30, 2020   (CN) .......................... 202010369801.0

(51) Int. Cl.
*H04L 12/18*        (2006.01)

(52) U.S. Cl.
CPC ...... *H04L 12/1822* (2013.01); *H04L 12/1831* (2013.01)

(58) Field of Classification Search
CPC ... H04L 12/1822; H04L 12/1831; G06F 8/33; G06F 8/34; G06F 9/451; G06F 16/176; G06F 40/166; G06Q 10/101
See application file for complete search history.

(56) References Cited

U.S. PATENT DOCUMENTS

| 2006/0010197 A1 | 1/2006 | Ovenden |
| 2007/0044010 A1 | 2/2007 | Sull et al. |

(Continued)

FOREIGN PATENT DOCUMENTS

| CN | 104038722 A | 9/2014 |
| CN | 109976617 A | 7/2019 |

(Continued)

OTHER PUBLICATIONS

EP Extended Search Report issued Aug. 3, 2023 in EP Patent Application No. 201795363.7 (8 pages).

(Continued)

*Primary Examiner* — Farzana B Huq

(57) ABSTRACT

Disclosed in embodiments of the present invention are an interaction method and apparatus, and an electronic device. A specific embodiment of the method comprises: in response to a creation instruction, presenting a display area for a new file indicated by the creation instruction, wherein the display area is used for displaying file content of the new file for a multi-media conference, and the file content is edited by a target having editing permissions; and updating, on the basis of an editing operation of the target having the editing permissions, the file content presented in the display area. Therefore, a new interaction mode for a multi-media conference is provided.

15 Claims, 9 Drawing Sheets

---

Present, in response to a creation instruction, a display area of a newly created file indicated by the creation instruction    ⟶ 101

↓

Update, based on an editing operation of an object with editing authorization, a file content displayed in the display area    ⟶ 102

Related U.S. Application Data continuation of application No. PCT/CN2021/087386, filed on Apr. 15, 2021.

(56) References Cited

U.S. PATENT DOCUMENTS

| | | |
|---|---|---|
| 2011/0093492 A1 | 4/2011 | Sull et al. |
| 2016/0070684 A1* | 3/2016 | Kesarwani ............ H04W 4/029 715/753 |
| 2016/0182412 A1 | 6/2016 | Kabbes et al. |
| 2017/0048286 A1 | 2/2017 | Ichihashi |
| 2018/0121214 A1* | 5/2018 | Faulkner ............. G06F 3/04883 |
| 2019/0146898 A1 | 5/2019 | Silva et al. |
| 2019/0147402 A1* | 5/2019 | Sitrick ................ H04L 12/1822 705/301 |
| 2019/0155870 A1 | 5/2019 | Prakash et al. |
| 2020/0125218 A1* | 4/2020 | Bender .................. H04L 51/04 |
| 2021/0286486 A1 | 9/2021 | Shelke |

FOREIGN PATENT DOCUMENTS

| | | |
|---|---|---|
| CN | 112306595 A | 2/2021 |
| JP | 2005-267021 A | 9/2005 |
| JP | 2009-069899 A | 4/2009 |
| JP | 2010-211569 A | 9/2010 |
| WO | 2012/137215 A1 | 10/2012 |

OTHER PUBLICATIONS

International Search Report issued Jul. 19, 2021 in International Patent Application No. PCT/CN2021/087386.

Written Opinion for International Application No. PCT/CN2021/087386, mailed Jul. 19, 2021, 11 Pages.

* cited by examiner

INTERACTION METHOD AND APPARATUS, AND ELECTRONIC DEVICE

The present disclosure is a continuation of U.S. patent application Ser. No. 17/877,984, filed on Jul. 31, 2022, which is a continuation of International Patent Application No. PCT/CN2021/087386, filed on Apr. 15, 2021, which claims priority to Chinese Patent Application No. 202010369801.0, titled "INTERACTION METHOD AND APPARATUS, AND ELECTRONIC DEVICE", filed on Apr. 30, 2020 with the National Intellectual Property Administration, PRC, both of which are incorporated herein by reference in their entireties.

FIELD

The present disclosure relates to the technical field of the Internet, and in particular to an interaction method, an interaction device, an electrical device, and a computer-readable medium.

BACKGROUND

With the development of the Internet, more and more users use the functions of terminal devices, which makes work and life more convenient. For example, a user may start a multimedia conference with other users online through a terminal device. Through an online multimedia conference between users, long-distance interaction can be realized, and the users can start a conference without having to all stay in one place. With the multimedia conference, limitations of a traditional face-to-face conference on location and venue can be largely avoided.

SUMMARY

This summary section is provided to introduce, in a simplified form, concepts that are described in detail in the detailed description section. This summary section is not intended to identify key features or essential features of the claimed technical solution, nor is it intended to limit the scope of the claimed technical solution.

An interaction method, an interaction device, an electronic device, and a computer-readable medium are provided according to the embodiments of the present disclosure.

In a first aspect, an interaction method is provided according to an embodiment of the present disclosure, which includes: presenting, in response to a creation instruction, a display area of a newly created file indicated by the creation instruction, where the display area is used to display a file content of a newly created file for a multimedia conference, and the file content is edited by an object with editing authorization; and updating, based on an editing operation of the object with editing authorization, the file content displayed in the display area.

In a second aspect, an interaction device is provided according to an embodiment of the present disclosure, which includes: a first presentation unit and a second presentation unit, The first presentation unit is configured to configured to present, in response to a creation instruction, a display area of a newly created file indicated by the creation instruction, where the display area is used to display a file content of the newly created file for a multimedia conference, and the file content is created by an editor with editing authorization. The second presentation unit is configured to update the file content displayed in the display area based on an editing operation of the object with editing authorization.

In a third aspect, an electronic device is provided according to an embodiment of the present disclosure, which includes: one or more processors; and a storage device. The storage device is configured to store one or more programs, where the one or more programs, when executed by the one or more processors, cause the one or more processors to perform the interaction method according to the first aspect.

In a fourth aspect, a computer-readable medium is provided according to an embodiment of the present disclosure, on which a computer program is stored. The program, when executed by a processor, performs the interaction method according to the first aspect.

With the interaction method, the interaction device, the electronic device and the computer-readable medium according to the embodiments of the present disclosure, a display area for a newly created file is generated in response to a creation instruction and is displayed, so that a shared file may be created in a process of a multimedia conference, and participants know a process of generating a shared file. In this way, a participant of the multimedia conference can share information with other participants in time through the newly created shared file, and participants may interact with each other about the generation process, so that the interaction efficiency of the multimedia conference can be improved, thereby shortening the time duration of the multimedia conference, thus reducing the computing resources and communication resources consumed by the multimedia conference.

BRIEF DESCRIPTION OF THE DRAWINGS

The above and other features, advantages and aspects of the embodiments of the present disclosure will become more apparent with reference to the following detailed description in conjunction with the drawings. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Figure 1:
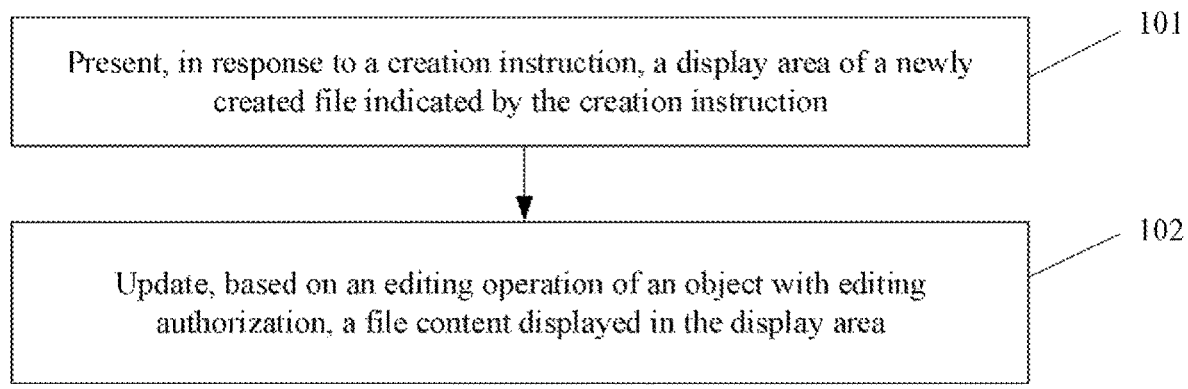
FIG. 1 is a flowchart of an interaction method according to an embodiment of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein, but rather are provided for the purpose of more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or performed in parallel. Furthermore, method embodiments may include additional steps and/or omit performing the illustrated steps. The scope of the present disclosure is not limited in this regard.

The term "comprising" and variations thereof as used herein are non-inclusive, that is, "including but not limited to". The term "based on" means "based at least in part on." The term "one embodiment" means "at least one embodiment". The term "another embodiment" means "at least one another embodiment". The term "some embodiments" means "at least some embodiments". Related definitions of other terms will be given in the description below.

It should be noted that concepts such as "first" and "second" mentioned in the present disclosure are only used to distinguish different devices, modules or units, and are not used to limit the order or interdependence of functions executed by these devices, modules or units.

It should be noted that the modification of "one" and "multiple" mentioned in the present disclosure is illustrative rather than restrictive, and those skilled in the art should understand that unless the context clearly indicates otherwise, they should be understood as "one or more".

The names of messages or information exchanged between multiple devices in the embodiments of the present disclosure are only used for illustrative purposes, and are not used to limit the scope of these messages or information.

Reference is made to FIG. 1, which shows a flow of an interaction method according to an embodiment of the present disclosure. As shown in FIG. 1, the interaction method includes the following steps 101 and 102.

In step 101, a display area of a newly created file is generated in response to a creation instruction.

In the embodiment, an execution body (for example, a terminal device) of the interaction method may generate a display area of a newly created file in response to a creation instruction.

Here, the creation instruction is used to trigger the execution body to generate and display the display area.

In the embodiment, the creation instruction may be generated by the execution body, or may be forwarded by a server supporting a multimedia conference. In other words, if the creation instruction is forwarded by a server supporting a multimedia conference, the creation instruction may be generated by another participant of the multimedia conference (that is, a participant other than the executive body).

Here, the multimedia conference may be an online conference conducted in a multimedia manner. Multimedia may include, but is not limited to, at least one of audio and video.

In the embodiment, an application for enabling a multimedia conference may be of any type, which is not limited here. For example, the application may be a video conferencing application, a communication application, a video playback application, a mail application, and the like.

Here, the display area of a newly created file may be used to display a file content in the newly created file.

Here, the newly created file may be created by a participant in the process of the multimedia conference, and is specifically created by using a file content entered by the participant in the multimedia conference. In other words, the shared file of the multimedia conference may include an exist shared file and a newly created file, and the exist shared file may be added to the multimedia conference.

Here, the server may generate an identifier of the newly created file in response to the creation instruction, and bind the identifier of the newly created file with an identifier of the multimedia conference. Thus, the server may determine the identifier of the newly created file bound to the identifier of the multimedia conference as an identifier of a newly created file for the multimedia conference. The server may send the identifier of the newly created file for the multimedia conference to the participant of the multimedia conference. The participant of the multimedia conference may display the display area of the newly created file indicated by the received identifier of the newly created file.

In an embodiment, the object with editing authorization may be a participant of the multimedia conference, or may not be a participant (that is, a non-participant) of the multimedia conference. Here, the editing authorization may include processing the file content by using at least one manner of adding, deleting, modifying and checking.

For example, an initiator of the newly created file may share the newly created file with a user who is not a participant of the multimedia conference, and the user may edit the newly created file. The file content edited by the user may also be displayed in the display area as the file content of the newly created file.

In an embodiment, the newly created file may be created before the multimedia conference, or in the multimedia conference.

In step 102, the file content displayed in the display area is updated based on an editing operation of an object with editing authorization.

In the embodiment, the execution body may update the file content displayed in the display area based on an editing operation of an object with editing authorization.

It should be noted that, if the object with editing authorization does not perform an editing operation, the display area may not display the file content.

In an embodiment, if the executive body is a party (that is, an initiator) to initiate creation of a newly created file, and the executive body does not start to share the newly created file with other participants of the multimedia conference, and also does not start to share the newly created file with an object that is not the participant of the multimedia conference, the newly created file is only displayed locally, and is not shared with other objects. However, it should be noted that the executive body may have the authorization (or capability) to share the newly created file.

In an embodiment, if executive body is not an initiator, but a participant sharing with the initiator, the executive body may show a file content. If the initiator authorizes editing authorization to the participant corresponding to executive body, the executive body may edit the file content in the display area.

In an embodiment, if the executive body is not an initiator, but a non-participant sharing with the initiator, the executive body may show a file content. If the initiator authorizes the editing authorization to the non-participant corresponding to executive body, the executive body may edit the file content in the display area.

It should be noted that, with the interaction method in this embodiment, a display area for a newly created file can be generated in response to a creation instruction and is displayed, so that the newly created file can be created for the multimedia conference. In this way, the participant can record or share the file content related to the conference in time, so that the interaction efficiency of the multimedia conference can be improved, thereby shortening the time duration of the multimedia conference, thus reducing the computing resources and communication resources consumed by the multimedia conference.

Figure 2:
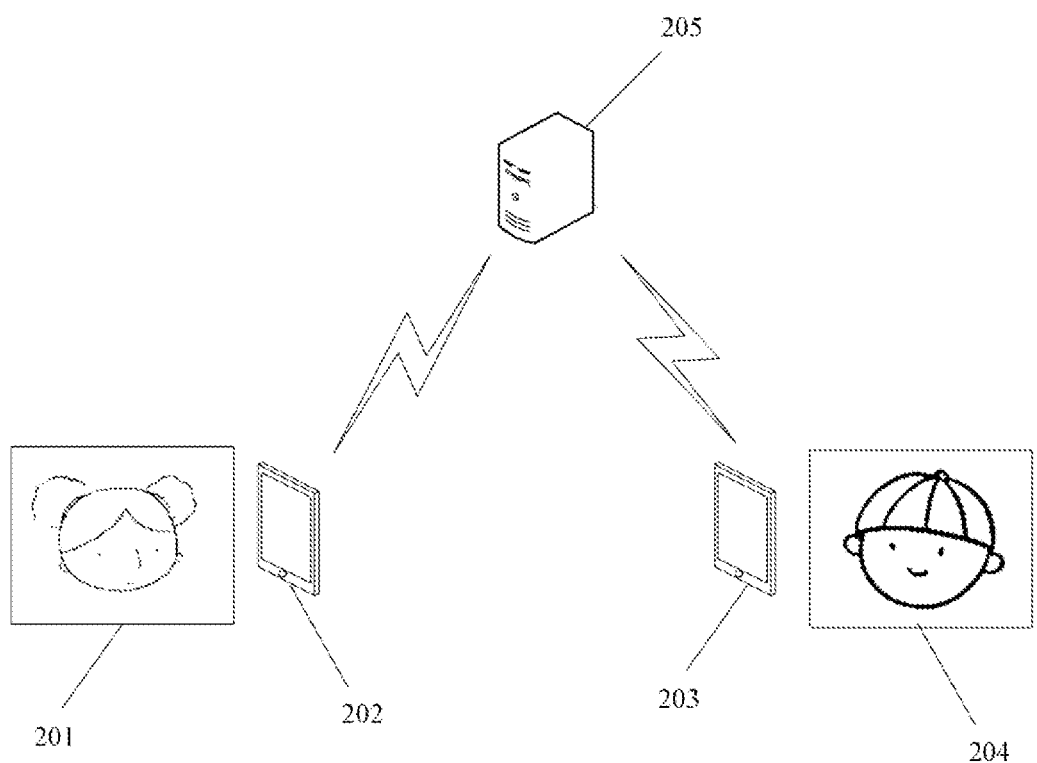
FIG. 2 to FIG. 3 are schematic diagrams of an application scenario of the interaction method according to the present disclosure.
Figure 3:
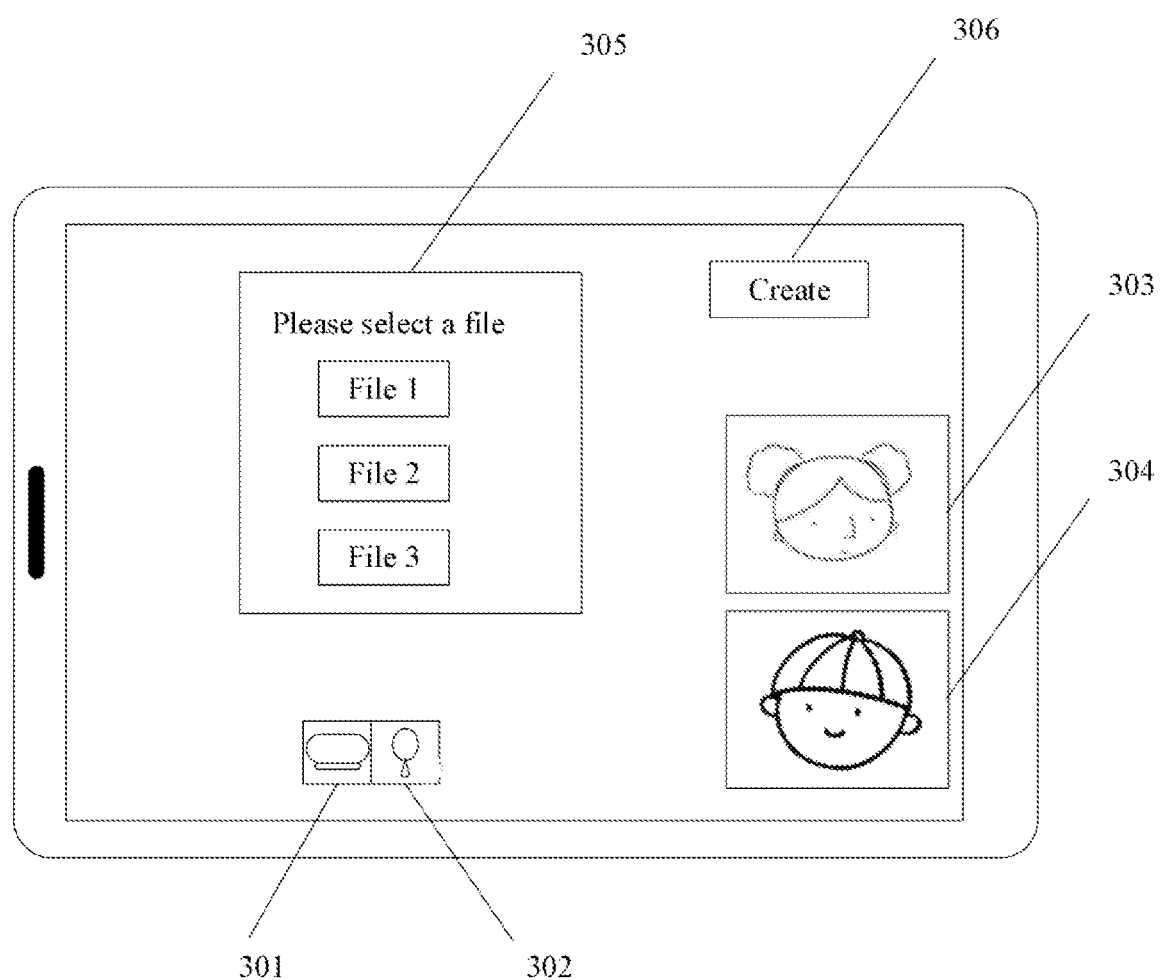

In some application scenarios, referring to FIG. 2 and FIG. 3, FIG. 2 and FIG. 3 show an exemplary scenario of the interaction method according to the present disclosure.

In FIG. 2, a first user 201 may participate in a multimedia conference through a terminal 202, and a second user 204 may participate in the multimedia conference through a terminal 203. Here, the first user and the second user may participate in the same multimedia conference. A server 205 may be used to support a multimedia conference. The server 205 may have a communication connection with the terminal 202, and the server 205 may also have a communication connection with the terminal 203.

Here, if the first user 201 or the second user 204 clicks a sharing content control on a multimedia conference interface, the content sharing interface may be implemented. For the convenience of description, assuming that the first user 201 clicks the sharing content control, the terminal 202 may display an interface as shown in FIG. 3.

on the interface shown in FIG. 3, the sharing content control 301 may be used to trigger initiation of content sharing, and a microphone control 302 may be used to control turning on or off a microphone. A first user video display area 303 may be used to display a video of the first user, and a second user video display area 304 may be used to display videos of multiple users. The existing file display area 305 may be used to display existing files used for sharing. It can be seen that a prompt "Please select a file" may be shown in the existing file display area 305, and "File 1" and "File 2" and "File 3" are shown, the user may initiate sharing by clicking one or at least two of "File 1", "File 2" and "File 3". A prompt "Create" may be shown on a creation control 306, to prompt the user to click on the creation control, which may trigger creation of a shared file in a multimedia conference and sharing a process of generating the shared file in real time.

It should be noted that, a display area for a newly created file is generated in response to a creation instruction and is displayed, so that shared file may be created in a process of a multimedia conference, and participants know a process of generating a shared file. In this way, a participant of the multimedia conference can share information with other participants in time through the newly created shared file, and the participants may interact with each other about the generation process, so that the interaction efficiency of the multimedia conference can be improved, thereby shortening the time duration of the multimedia conference, thus reducing the computing resources and communication resources consumed by the multimedia conference.

In some application scenarios, in response to receiving the creation instruction, the display area may be generated and presented immediately, or after a time delay. For example, if the execution body is displaying another shared file, a prompt about creating a file may be issued in response to receiving the creation instruction, and when the user confirms to display the newly created file, the display area is generated and displayed.

A file content displayed in the display area includes at least one of the following: a file content edited by a locally logged-in user; and a file content entered by another user with editing authorization, where the another user may be a user other than the locally logged-in user. The another user participating in the conference includes at least one of the following: a participant or a non-participant of the multimedia conference.

Here, the locally logged-in user may be indicated by a user identifier of a client that logs in to perform a multimedia conference. For example, if a human user makes a click operation on the client of the multimedia conference, the execution body (such as a terminal device) may determine the user indicated by the user identifier currently logged-in as an executor of the click operation, that is, a locally logged-in user. In other words, the execution body may use the user identifier currently logged-in as the locally logged-in user.

It should be noted that, the file content entered by the locally logged-in user and the file content entered by another user may both be displayed in the display area. Thus, the file content entered by each user may be displayed in the display area, so that each user related to the file may be synchronized to generate a sharing content in time.

In some embodiments, the display structure of the display area may be various, which is not limited here. For example, the display structure of the display area may be default, or may be determined based on a target type of a shared file to be generated selected by a participant.

Figure 4:
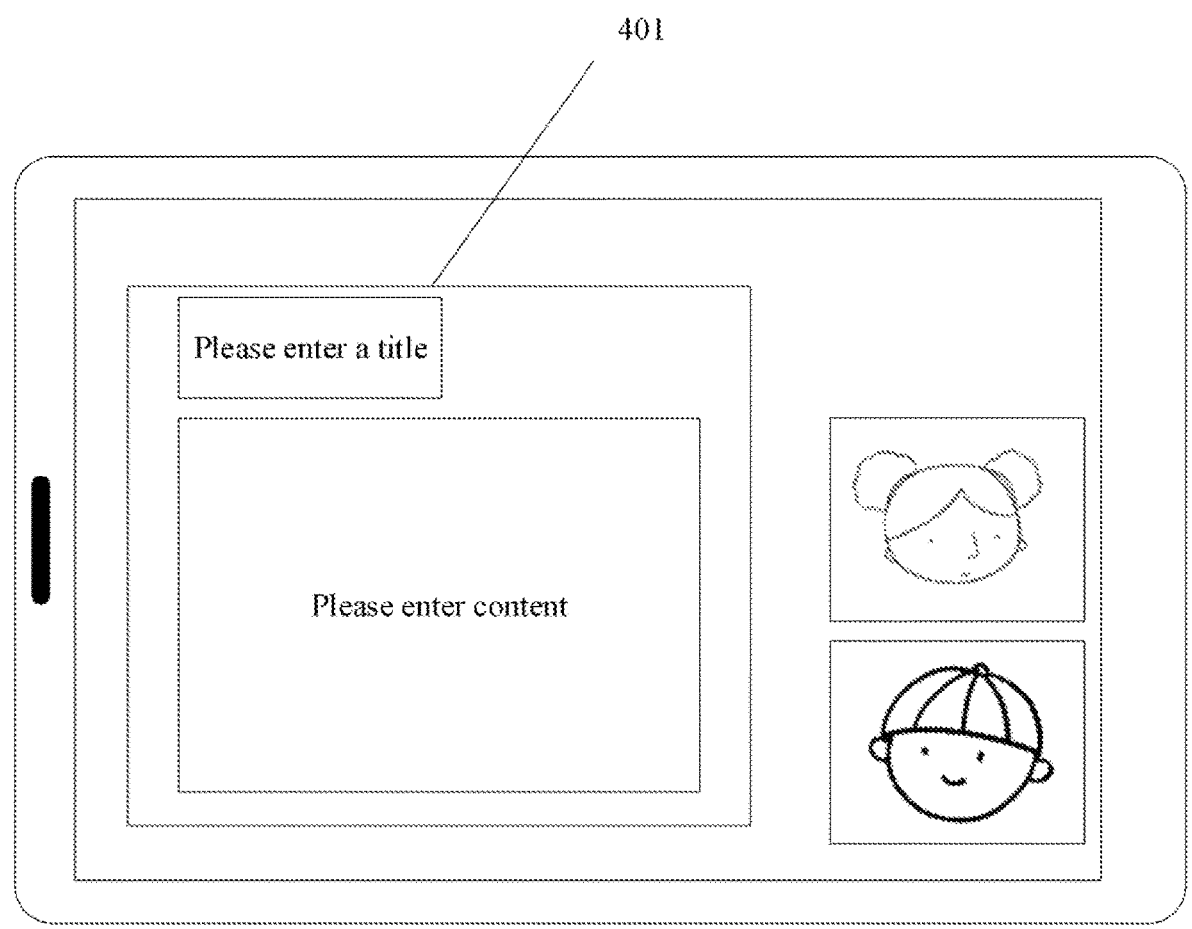
FIG. 4 is a schematic diagram of another application scenario of the interaction method according to the present disclosure.

In some embodiments, the step 101 may include: presenting the display area by using a default display structure. In some application scenarios, referring to FIG. 4, which shows a display structure of the display area displayed by a terminal in response to the creation instruction. The interface shown in FIG. 4 displays a display area 401 of a default structure.

In some embodiments, the step 101 may include: determining a display structure of the display area based on a target type of the newly created file; and presenting the display area by using the determined display structure.

Here, the target type of the shared file may be any one of the following: a document, a table, a presentation document, and a thought note.

Here, a relationship between a file type and a display structure of a display area may be preset. Here, the display structure corresponding to the file type may be preset according to an actual application scenario, which is not limited here.

It should be understood that a display structure of a display area for generating a file of a document type and a display structure of a display area for generating a file of a table type are different from each other.

It should be noted that, using a display structure corresponding to the target type can facilitate generating a shared file of the target type, that is, before generating the shared file, the target type specified by the user can be used for generating pertinently. In this way, the types of shared files can be enriched, and when there are multiple types of shared files that can be generated, the user can be prompted to enter content suitable for the target type based on a corresponding display structure. The content suitable for the target type can be obtained conveniently during entering of the user, thereby improving the speed of generating the file content of the target type.

Here, the target type may be determined by the following type determination steps: displaying, in response to detecting a trigger operation on a creation control, at least one file type; determining, based on a selection operation on the at least one file type, the target type of the newly created file.

Here, an electronic device performing the type determination steps may be the execution body or another participant. If the electronic device is the execution body, the execution body may locally obtain the target type; if the electronic device is another participant, after obtaining the target type, the other participant may send the target type to a server, and the server may forward the target type to the execution body.

Here, the file type may be displayed in various ways, for example, the name of the file type, an indication diagram of the file type, or a template style of the file type, and the like, which are not limited herein.

Figure 5:
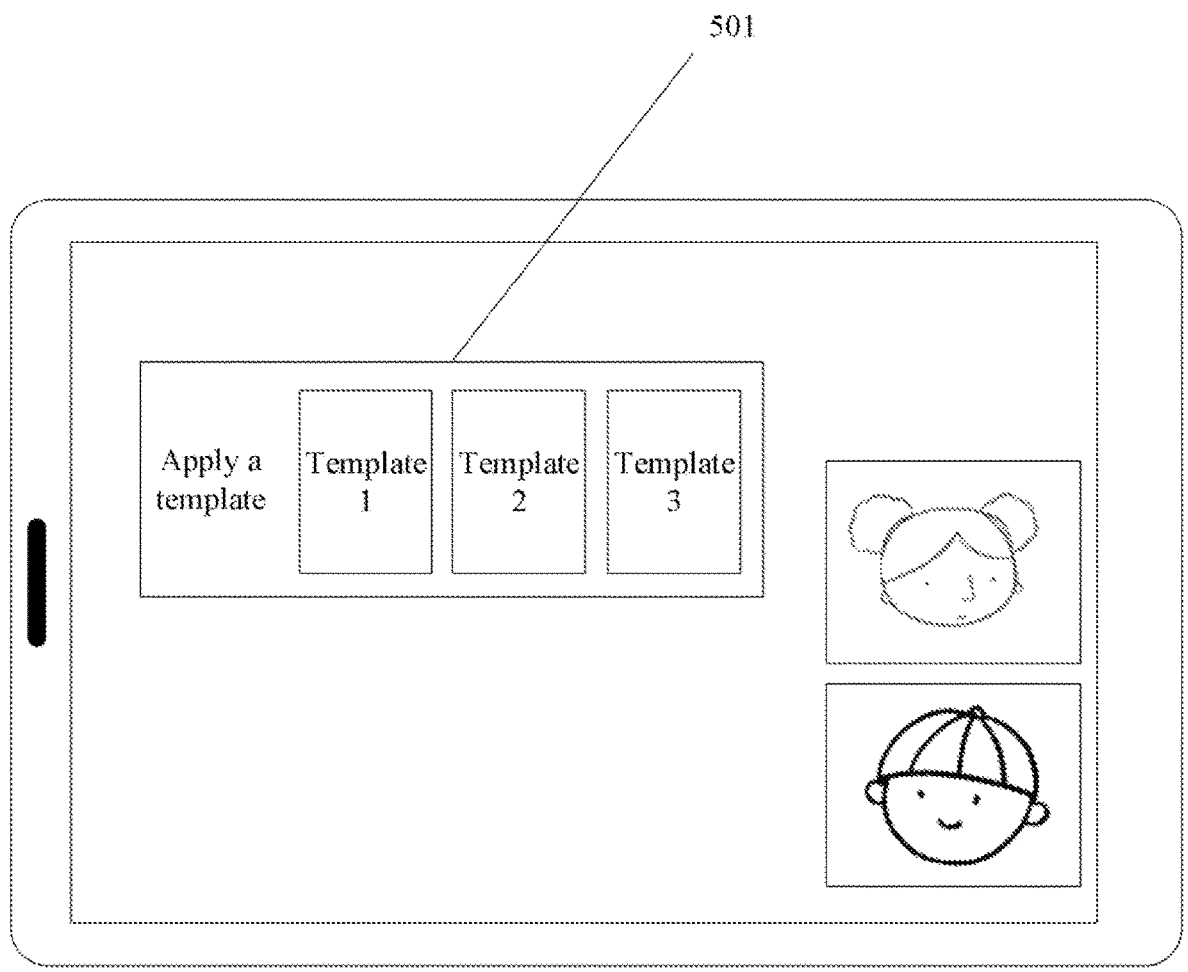
FIG. 5 is a schematic diagram of another application scenario of the interaction method according to the present disclosure.

In some application scenarios, reference is made to FIG. 5, which shows an interface displayed by a terminal that initiates creation of a shared file after triggering the creation control. on the interface of FIG. 5, a file type selection control 501 is displayed. In the file type selection control 501, "Template 1", "Template 2" and "Template 3" may be displayed, which respectively indicate different file types. In the file type selection control 501, a prompt "Apply a template" may be shown to prompt the user to select "Template 1", "Template 2" or "Template 3", and a file type indicated by a template selected by the user may be used as the target type.

It should be noted that, by displaying the file types after detecting the trigger operation on the creation control, for the user to select the target type, a display area of a display structure suitable for of the target type may be displayed before the display area is generated for the first time, so that it can be avoided to use the display structure of the target type after the default display structure has been adopted. That is, by avoiding the use of the default display structure and the switch from the default display structure to the display structure of the target type, computing resources consumed by generating a shared file of the target type can be reduced.

In some embodiments, the execution body may generate a creation instruction in response to detecting a trigger operation on the creation control for the multimedia conference.

Here, the execution body detecting the trigger operation on the creation control, and generating the creation instruction indicates that the locally logged-in user of the execution body is an initiator of the newly created file.

In an embodiment, the presentation timing of the creation control is selectable, for example, the creation control may be presented on a conference preview interface before the multimedia conference is started, and may also be presented in the conference process after the multimedia conference is started.

In an embodiment, the interface on the conference process may be any interface, such as an interface for selecting a content to be shared, or a multimedia conference interface.

In some embodiments, the method includes: the execution body may, in response to detecting a triggering operation on the creation control for the multimedia conference, enable an initiator-related authorization control.

Here, whether the executive body detects the trigger operation on the creation control for the newly created file may be understood as whether the locally logged-in user is the initiator, or the initiator identifier received by the server is identical to the user identifier of the locally logged-in user.

Here, the related authorization controls may include at least two types, that is, controls related to authorization of an initiator, and controls related to authorization of a non-initiator.

It may be understood that the server or the execution body may preset a correlation relationship between the authorization and the function control. The executive body may determine a function control related to the authorization of the locally logged-in user based on the preset correlation relationship.

It should be noted that, according to whether the locally logged-in user is an initiator (that is, whether the trigger operation on the creation control is detected), different related controls may be enabled, and the authorization of the newly created file may be distinguished, so that the newly created file is initiated by the initiator while the risk of possible leakage or tampering of the information in the newly created file can be avoided.

In some embodiments, the enabling the related authorization control according to whether the locally logged-in user is an initiator of the newly created file includes: enabling, in response to determining that the locally logged-in user is the initiator, the initiator-related authorization control.

In some embodiments, the initiator-related authorization control includes, but is not limited to, at least one of: a file type selection control, a presentation authorization handover control, an editing authorization modification control, and an editing control.

Figure 6:
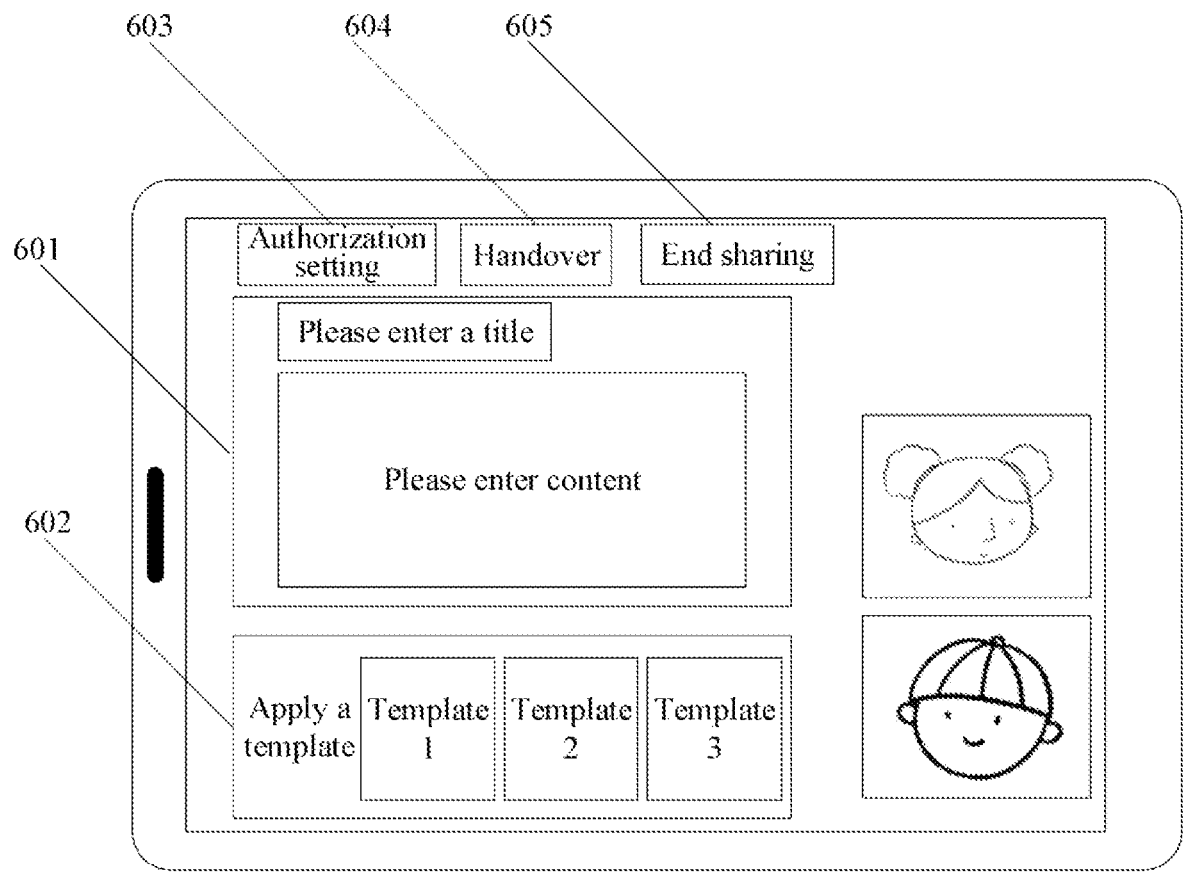
FIG. 6 is a schematic diagram of another application scenario of the interaction method according to the present disclosure.

In some application scenarios, referring to FIG. 6, which shows another interface displayed by a terminal that initiates creation of a shared file after triggering the creation control. on the interface of FIG. 6, a display area 601 of a default structure and a file type selection control 602 may be displayed in parallel. For the specific description of the display area 601 of the default structure, reference may be made to the display area 401 of the default structure, and for the specific description of the file type selection control 602, reference may be made to the file type selection control 502.

Continually referring to FIG. 6, FIG. 6 shows an editing authorization modification control 603, a presentation authorization handover control 604, and a sharing ending control 605.

In some embodiments, the method may further include: displaying, in response to determining that the locally logged-in user is the initiator of the newly created file, a file type selection control on the display interface of the display area of the default display structure.

It should be noted that, on the display interface of the display area of the default display structure, the file type selection control is displayed, so that the user can be prompted to select a file type, thereby improving the efficiency of generating the shared file, thus reducing the computing resources consumed by generating the shared file.

Here, the style and display position of the presentation authorization handover control may be set according to actual situations, which is not limited herein.

In some embodiments, the method may further include: sending, in response to detecting a trigger operation on the presentation authorization handover control, a presentation authorization handover notification to the server based on a specified handover object identifier.

Here, the presentation authorization handover notification in the conference may include a handover object identifier. The handover object identifier indicates that a participant that is a presentation authorization handover object.

In some application scenarios, the execution body may display the participant identifier of the multimedia conference in response to the trigger operation on the presentation authorization handover control. Then, the user may select one or more participant identifiers as the handover object identifiers. Finally, the executive body may send an initiator authorization handover notification including the handover object identifier to the server.

Here, a participant newly obtaining presentation authorization may present the newly created file, and other users may watch the newly created file following the presentation of the user with presentation authorization.

Here, through the presentation authorization handover control, a target participant with presentation authorization may handover the presentation authorization to other participants of the multimedia conference, so as to realize the handover of the presentation authorization. Therefore, in the process of the multimedia conference, an object with presentation authorization that is suitable for the current process may be determined according to the actual process, so as to avoid a situation that an original presenter is not suitable for the current conference process and thus cause a poor interaction of the multimedia conference, so that the interaction efficiency of the multimedia conference can be improved, thereby reducing the time duration of the multimedia conference, thus reducing the computing resources and communication resources consumed by the multimedia conference.

In some embodiments, the method may further include: displaying, in response to determining that the locally logged-in user is the initiator of the newly created file, an editing authorization modification control for the newly created file.

Here, the initiator of the newly created file may control an editing authorization on a content of the target file.

Here, the specific implementation of the editing authorization modification control may be set according to actual situations, which is not limited herein.

In some embodiments, the method may further include: generating, in response to detecting a triggering operation on the editing authorization modification control, editing authorization information about the newly created file based on an editing authorization modified by the initiator.

Here, the editing authorization information may indicate some authorizations of a participant on the newly created file. The editing authorization may include, but is not limited to, at least one of the following: a read authorization, an editing authorization, a save authorization, and the like. The editing authorization modification control may be used to modify one or at least two editing authorizations.

Here, the specific implementation of the editing authorization modification control may affect a triggering manner of the editing authorization modification control, that is, a manner in which the initiator modifies the editing authorization.

In some application scenarios, the editing authorization modification control may include an entry control and a specific authorization control. The user may click the entry control, and the execution body may show at least one specific authorization control, and the specific authorization control may set the editing authorization control for a single authorization, for example, the editing authorization, and the editing authorization control may be set with an open state and a closed state. The open state indicates a participant who is not an initiator may edit the newly created file, and the closed state indicates that a participant who is not the initiator of the newly created file cannot edit the newly created file.

In some application scenarios, the editing authorization modification control may be set on a setting interface of the user. An editing authorization about a file content set by the user on the setting interface may be applied to all newly created files created by the user in each multimedia conference. Thus, the one-time setting of the user may be applied to all file contents including the newly created file, which can save the time of the user for setting editing authorization.

It should be noted that, through the editing authorization modification control, the initiator may set the editing authorization of the newly created file, so that an editing authorization suitable for the newly created file can be set according to the actual situation of the newly created file, thereby improving the flexibility of the editing authorization. Through the flexible editing authorization, it can be ensured that the information in the newly created file is communicated while the risk of leakage or tampering of the information in the newly created file can be avoided.

In some embodiments, the initiator-related authorization control includes an editing control. The method further includes: receiving, in response to detecting a trigger operation on the editing control, an edited file content and displaying the edited file content. The specific content of the editing control may be set according to the required editing manner, which is not limited here. For example, the editing control may refer to the settings of various editing controls in the document editing software.

In some embodiments, the creation control is set on the interface for selecting a content to be shared of the multimedia conference. The method further includes: determining, in response to detecting a trigger operation on the creation control on the interface for selecting a content to be shared, to share the file content with another participant of the multimedia conference.

It should be noted that, if the user triggers the creation control on the interface for selecting a content to be shared, it may be directly determined that the file content is shared with the participant. In this way, when the user opens the interface for selecting a content to be shared to share a file while the existing file cannot meet the requirement of the user, by providing a creation control, the user may create a newly created file without switching the interface, so that the operation step for the user to switch the interface can be reduced, thereby improving the speed of creating a new shared file. In addition, the user can directly determine to share the newly created file, so that the operation step for user to determine whether to share can be reduced, thereby improving the speed of sharing a file. Therefore, the interaction efficiency of the conference can be improved, the conference process can be accelerated, and the computing resources and communication resources consumed by the multimedia conference can be reduced.

In some embodiments, the creation control is set on a multimedia conference interface. The method further includes: determining, in response to detecting a trigger operation on the creation control on the multimedia conference interface, whether to share the file content with another participant of the multimedia conference based on preset sharing enabling instruction information.

Here, the sharing enabling indication information may indicate whether to share the newly created file by default.

It should be noted that, if the user triggers a creation control of the multimedia conference interface, it is required to determine whether to enable sharing based on preset sharing enable instruction information. Therefore, after the user creates a file related to the multimedia conference, the user may reserve the authorization to share or not. If the user does not share, it is convenient for the user to record the content related to the multimedia conference for their own browsing, and if the user shares, it is convenient for the user to display conference-related information to other participants.

In some embodiments, the method further includes: determining, in response to determining to share the file content with another participant of the multimedia conference, a participant with viewing authorization based on specified viewing range indication information.

Here, the viewing range indication information may include a user identifier, and the viewing range indication information may be provided by the initiator after determining to share the file content with another participant of the multimedia conference, or may be provided in advance by the initiator.

In some application scenarios, an entry for setting the viewing range indication information may be set on the setting interface of the user. The viewing range indication information set by the user in the setting interface may be applied to all newly created files created by the user in each multimedia conference. Therefore, the one-time setting of the user may be applied to all newly created files, which can save the time of the user for setting the viewing range indication information.

It should be noted that, determining a participate with viewing authorization based on the viewing range indication information may ensure the confidentiality of the newly created file, and avoid leakage of file content.

In some embodiments, the execution body responding to the creation instruction in step 101 may be understood as responding to the creation notification sent by the server based on the creation instruction. The server sends a creation notification in response to receiving the sent creation instruction. Here, the creation instruction is sent by the participant in response to detecting a triggering operation on the creation control.

It may be understood that the object to which the server sends a creation notification may be the participant (for example, the execution body) with viewing authorization of the multimedia conference. For example, the participant to which the creation notification is sent may be any participant other than a participant that sends the creation instruction.

In some embodiments, the step 101 may include: presenting, in response to receiving a creation notification generated based on the creation instruction, a display area of the newly created file indicated by the creation instruction.

It should be noted that any participant (for example, a user A) may generate a creation instruction, and send the generated creation instruction to the server. In response to receiving the creation instruction, the server may send a creation notification to other participants (for example, participants other than the user A). The other participants may include the executive body, and the executive body may receive and generate and display the display area based on the creation notification.

That is, no matter which user of the multimedia conference initiates and generates the file to be generated, users of the multimedia conference may all show the file content of the newly created file. Therefore, the situation related to the newly created file of the multimedia conference may be notified to each participant in time, thereby improving the interaction efficiency of the multimedia conference.

In some embodiments, the enabling the related authorization control according to whether the locally logged-in user is the initiator of the newly created file includes: determining, in response to determining that the locally logged-in user is not the initiator, whether to enable the editing control based on the editing authorization specified by the initiator.

In some application scenarios, as described above, the editing authorization may include, but is not limited to, at least one of the following: a read authorization, an editing authorization, a save authorization, a download authorization, and the like.

For example, if a sharer of the file content determines that the editing authorization of the newly created file including an editing authorization, the executive body may show controls related to the editing authorization, for example, some function controls required for editing, such as a modify control for adjusting the line spacing.

For example, if the sharer of the file content determines that the editing authorization of the newly created file includes a saving authorization, the executive body may display controls related to the saving authorization.

For example, if the sharer of the file content determines that the editing authorization of the newly created file includes a download authorization, the executive body may display controls related to the download authorization.

It should be noted that, by determining whether to enable the editing control of the executive body based on the editing authorization specified by the initiator, it can effectively avoid a participant without authorization from editing the newly created file, so that it can be ensured that the information in the newly created file is communicated while the risk of possible leakage or tampering of the information in the newly created file can be avoided.

In some embodiments, the method may further include: sharing, in response to detecting a file content entered by using the editing control, the file content with an object displaying the newly created file.

It should be noted that, if the executive body is an object with editing authorization, the sharing content edited in the executive body may be synchronized to the object (including a participant or a non-participant) displaying the newly created file.

Figure 7:
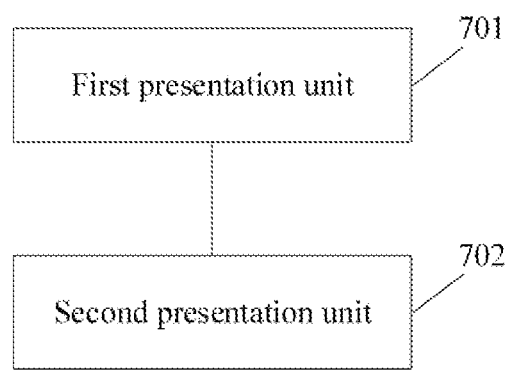
FIG. 7 is a schematic structural diagram of an interaction device according to an embodiment of the present disclosure.

Further referring to FIG. 7, as an implementation of the methods shown in the above figures, an interaction device is further provided according to an embodiment of the present disclosure. The device embodiment corresponds to the method embodiment shown in FIG. 1. Specifically, the device may be applied to various electronic devices.

As shown in FIG. 7, the interaction device in the embodiment includes: a first presentation unit 701 and a second presentation unit 702. The first presentation unit 701 is configured to present, in response to a creation instruction, a display area of a newly created file indicated by the creation instruction, where the display area is used to display a file content of the newly created file for a multimedia conference, and the file content is created by an editor with editing authorization. The second presentation unit 702 is configured to update the file content displayed in the display area based on an editing operation of the object with editing authorization.

In this embodiment, the specific processing of the first presentation unit 701 and the second presentation unit 702 of the interaction device and the technical effects thereof may be referred to in the corresponding embodiment of related descriptions of steps 101 and 102 in FIG. 1, which are not repeated here.

In some embodiments, the file content displayed in the display area includes at least one of the following: a file content edited by a locally logged-in user; and a file content entered by another user with editing authorization, where the another user is a user other than the locally logged-in user, and the another user includes at least one of the following: a participant or a non-participant of the multimedia conference.

In some embodiments, the presenting, in response to a creation instruction, a display area of a newly created file indicated by the creation instruction includes: determining a display structure of the display area based on a target type of the newly created file; and presenting the display area by using the determined display structure.

In some embodiments, the target type is determined by the following type determination steps: displaying at least one file type in response to detecting a trigger operation on a creation control; and determining the target type of the newly created file based on a selection operation on the at least one file type.

In some embodiments, the presenting, in response to a creation instruction, a display area of a newly created file indicated by the creation instruction includes: presenting the display area by using a default display structure.

In some embodiments, the device is further configured to: generate the creation instruction in response to detecting a triggering operation on a creation control for the multimedia conference.

In some embodiments, the device is further configured to: enable an initiator-related authorization control.

In some embodiments, the initiator-related authorization control includes a file type selection control; and the device is further configured to: display the file type selection control on a display interface of the display area with a default display structure.

In some embodiments, the initiator-related authorization control includes a presentation authorization handover control; and the device is further configured to send, in response to detecting a triggering operation on the presentation authorization handover control, a presentation authorization handover notification to a server based on a specified handover object identifier.

In some embodiments, the initiator-related authorization control includes an editing authorization modification control; and the device is further configured to generating, in response to detecting a triggering operation on the editing authorization modification control, editing authorization information about the newly created file based on a modified editing authorization.

In some embodiments, the initiator-related authorization control includes an editing control; and the device is further configured to display, in response to detecting a trigger operation on the editing control, an edited file content.

In some embodiments, the creation control is arranged on an interface for selecting a content to be shared for the multimedia conference; and the device is further configured to determine, in response to detecting a triggering operation on the creation control on the interface for selecting a content to be shared, to share the file content with another participant of the multimedia conference.

In some embodiments, the creation control is arranged on a multimedia conference interface; and the device is further configured to determine, in response to detecting a triggering operation on the creation control on the multimedia conference interface, whether to share the file content with another participant of the multimedia conference based on preset sharing enabling indication information.

In some embodiments, the device is further configured to determine, in response to determining to share the file content with another participant of the multimedia conference, a participant with viewing authorization based on specified viewing range indication information.

In some embodiments, a server sends, in response to receiving the creation instruction, a creation notification to a participant with viewing authorization, where the creation instruction received by the server is sent by the participant in response to detecting a trigger operation on a creation control.

In some embodiments, the presenting, in response to a creation instruction, a display area of a newly created file indicated by the creation instruction includes: presenting, in response to receiving the creation notification generated in response to the creation instruction, the display area of the newly created file indicated by the creation instruction.

In some embodiments, the device is further configured to determine whether to enable an editing control based on an editing authorization specified by an initiator.

In some embodiments, the device is further configured to share, in response to detecting a file content entered by using an editing control, the file content to an object presenting the newly created file.

Figure 8:
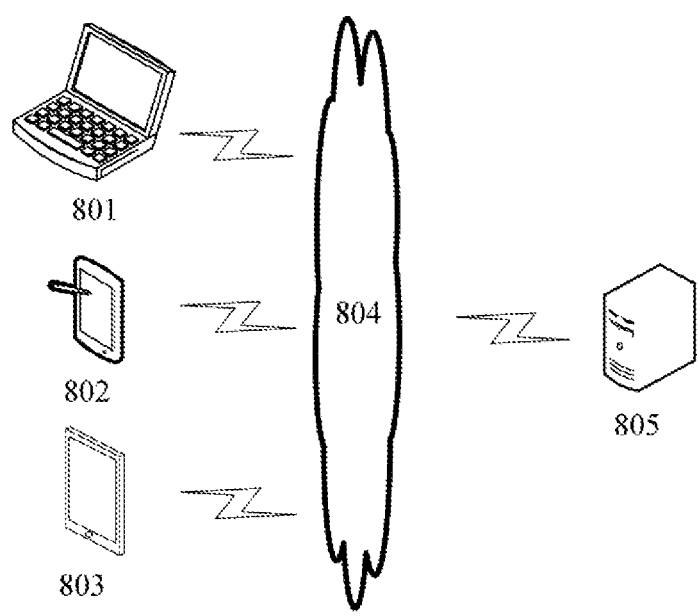
FIG. 8 shows an exemplary system architecture in which the interaction method according to an embodiment of the present disclosure may be applied.

Reference is made to FIG. 8, which shows an exemplary system architecture in which the interaction method according to the embodiment of the present disclosure may be applied.

As shown in FIG. 8, the system architecture may include terminal devices 801, 802, and 803, a network 804, and a server 805. The network 804 is a medium used to provide a communication link between the terminal devices 801, 802, 803 and the server 805. The network 804 may include various connection types, such as wired, wireless communication links, or fiber optic cables.

The terminal devices 801, 802, and 803 may interact with the server 805 through the network 804 to receive or send messages and the like. Various client applications may be installed on the terminal devices 801, 802 and 803, such as web browser applications, search applications, and news information applications. The client applications in the terminal devices 801, 802, and 803 may receive instructions from the user, and perform corresponding functions according to the instructions from the user, for example, adding corresponding information to the information according to the instructions from the user.

The terminal devices 801, 802, and 803 may be hardware or software. When the terminal devices 801, 802, and 803 are hardware, the terminal devices 801, 802, and 803 may be various electronic devices that have a display screen and support web browsing, including but not limited to smart phones, tablet computers, e-book readers, Moving Picture Experts Group Audio Layer III (MP3) players, Moving Picture Experts Group Audio Layer IV (MP4) Players, Laptops and Desktops, and the like. When the terminal devices 801, 802, and 803 are software, the terminal devices 801, 802, and 803 may be installed in the electronic devices listed above. The terminal devices 801, 802, and 803 may be implemented as multiple software or software modules (for example, software or software modules for providing distributed services), or may be implemented as a single software or software module, which is not limited here.

The server 805 may be a server that provides various services, such as receiving information acquisition requests sent by the terminal devices 801, 802, and 803, and acquiring display information corresponding to the information acquisition requests in various ways according to the information acquisition requests, and sending data related to the display information to the terminal devices 801, 802, and 803.

It should be noted that the interaction method according to the embodiment of the present disclosure may be executed by a terminal device, and correspondingly, the interaction device may be provided in the terminal devices 801, 802, and 803. In addition, the interaction method according to the embodiment of the present disclosure may also be executed by the server 805, and correspondingly, the interaction device may be provided in the server 805.

It should be understood that the numbers of terminal devices, networks and servers in FIG. 8 are merely illustrative. There may be any number of terminal devices, networks and servers according to implementation needs.

Figure 9:
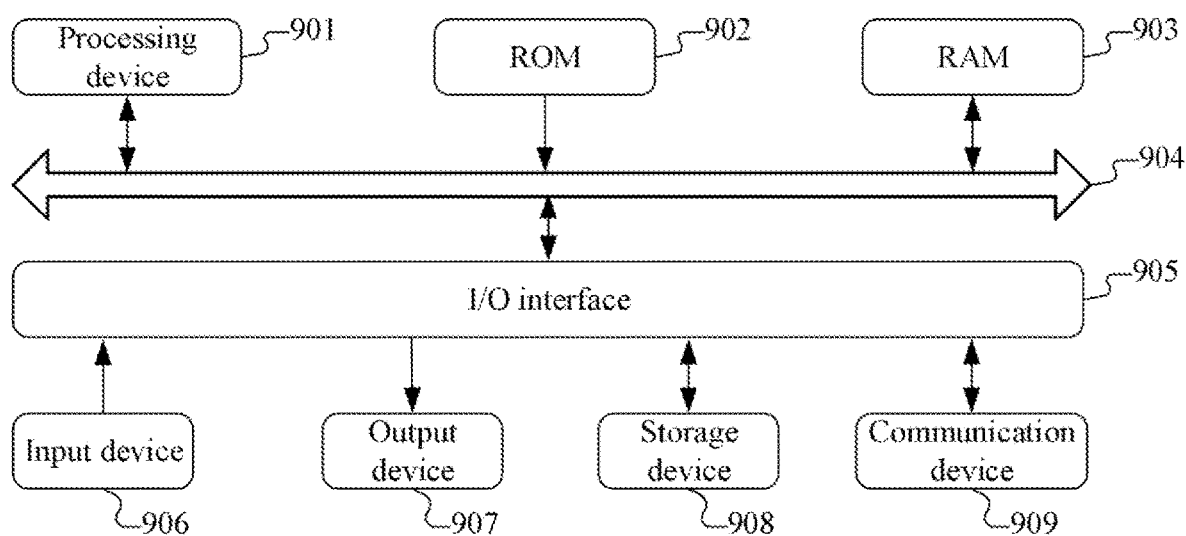
FIG. 9 is a schematic diagram of a basic structure of an electronic device according to an embodiment of the present disclosure.

Reference is made to FIG. 9, which is a schematic structural diagram of an electronic device (for example, the terminal device or the server in FIG. 8) suitable for implementing an embodiment of the present disclosure. Terminal devices in the embodiment of the present disclosure may include, but are not limited to, mobile terminals such as mobile phones, notebook computers, digital broadcast receivers, Personal Digital Assistants (PDAs), Tablets (PADs), Portable Multimedia Players (PMPs), vehicle-mounted terminals (for example, in-vehicle navigation terminals); and stationary terminals such as digital TVs, desktop computers. The electronic device shown in FIG. 6 is only an example, and should not impose any limitation on the function and use range of the embodiments of the present disclosure.

As shown in FIG. 9, the electronic device may include a processing device (for example, a central processing unit, a graphics processor, and the like) 901, which may execute various appropriate actions and processes based on programs stored in a read only memory (ROM) 902 or programs loaded from a storage device 908 into a random access memory (RAM) 903. In the RAM 903, various programs and data necessary for the operation of the electronic device 900 are also stored. The processing device 901, the ROM 902, and the RAM 903 are connected to each other through a bus 904. An input/output (I/O) interface 905 is also connected to bus 904.

In general, the following devices may be connected to the I/O interface 905: an input device 906 including, for example, a touch screen, a touch pad, a keyboard, a mouse, a camera, a microphone, an accelerometer, a gyroscope, and the like; an output device 907 including, for example, a liquid crystal display (LCD), a speaker, a vibrator, and the like; a storage device 908 including, for example, a magnetic tape, a hard disk, and the like; and a communication device 909. The communication device 909 may allow the electronic device to communicate wirelessly or by wire with other devices to exchange data. Although FIG. 9 shows an electronic device having various means, it should be understood that not all of the illustrated means are required to be implemented or available. More or fewer means may alternatively be implemented or provided.

In particular, according to embodiments of the present disclosure, the processes described above with reference to the flowcharts may be implemented as computer software programs. For example, a computer program product is provided according to an embodiment of the present disclosure include, which includes a computer program carried on a non-transitory computer readable medium, the computer program includes program codes for performing the method shown in the flowchart. In the embodiment, the computer program may be downloaded and installed from the network via the communication device 909, or from the storage device 908, or from the ROM 902. When the computer program is executed by the processing device 901, the functions defined in the methods of the embodiments of the present disclosure are executed.

It should be noted that the computer-readable medium of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus or device, or any combination thereof. More specific examples of computer readable storage medium may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that contains or stores a program that may be used by or in conjunction with an instruction execution system, apparatus, or device. In the present disclosure, the computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination thereof. The computer-readable signal medium may also be any computer-readable medium other than a computer-readable storage medium that may transmit, propagate, or transport the program for use by or in connection with the instruction execution system, apparatus, or device. Program codes embodied on a computer readable medium may be transmitted using any suitable medium including, but not limited to, electrical wire, optical fiber cable, radio frequency (RF), and the like, or any suitable combination thereof.

In some embodiments, the client and the server may use any currently known or future developed network protocol such as HTTP (HyperText Transfer Protocol) to communicate, and may interconnect with any form or medium digital data communications (for example, communications networks). Examples of communication networks include local area networks ("LAN"), wide area networks ("WAN"), the Internet (for example, the Internet), and peer-to-peer networks (for example, ad hoc peer-to-peer networks), as well as any currently known or future development networks.

The computer-readable medium may be contained in the electronic device, or exist alone without being assembled into the electronic device.

The computer-readable medium carries one or more programs, and when the one or more programs are executed by the electronic device, the electronic device is caused to: present, in response to a creation instruction, a display area of a newly created file indicated by the creation instruction, where the display area is used to display a file content of a newly created file for a multimedia conference, and the file content is edited by an object with editing authorization; and update, based on an editing operation of the object with editing authorization, the file content displayed in the display area.

Computer program codes for performing operations of the present disclosure may be written in one or more programming languages, including but not limited to object-oriented programming languages, such as Java, Smalltalk, C++, also including conventional procedural programming languages, such as the "C" language or similar programming languages.

The program codes may be executed entirely on a computer of a user, partly on a computer of a user, as a stand-alone software package, partly on a computer of a user and partly on a remote computer, or entirely on a remote computer or server. In the case of a remote computer, the remote computer may be connected to the computer of the user through any kind of networks, including a local area network (LAN) or a wide area network (WAN), or may be connected to an external computer (for example, via Internet connection by an Internet service provider).

The flowchart and block diagrams in the Figures illustrate the architecture, functionality, and operation that may be implemented by systems, methods and computer program products according to various embodiments of the present disclosure. In this regard, each block in the flowchart or block diagrams may represent a module, segment, or portion of code that contains one or more executable instructions for implementing specified logical functions. It should also be noted that, in some alternative implementations, the functions noted in the blocks may be implemented out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, may be implemented in dedicated hardware-based systems that perform the specified functions or operations, or may be implemented in a combination of dedicated hardware and computer instructions.

The units involved in the embodiments of the present disclosure may be implemented in a software manner, or in a hardware manner. The name of the unit does not constitute a limitation of the unit itself under certain circumstances, for example, the first presentation unit may also be described as a "unit for presenting a display area".

The functions described herein may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination thereof.

The above description only shows preferred embodiments of the present disclosure and an illustration of the applied technical principles. Those skilled in the art should understand that the scope of the present disclosure is not limited to the technical solutions formed by the specific combination of the technical features, and should also cover, without departing from the disclosed concept, other the technical solutions formed by any combination of the technical features and their equivalent features, for example, a technical solution is formed by replacing the above features with the technical features disclosed in the present disclosure (but not limited to) with similar functions.

Furthermore, although operations are described in a particular order, this should not be construed as requiring that the operations be performed in the particular order shown or in a sequential order. Under certain circumstances, multi-tasking and parallel processing may be advantageous. Likewise, although the above description contains several implementation details, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub combination.

Although the subject matter has been described in language specific to structural features and/or logical acts, it is to be understood that the subject matter defined in the claims is not necessarily limited to the specific features or acts described above. Rather, the specific features and acts described above are merely example forms of implementing the claims.

The invention claimed is:

1. An interaction method, comprising:
    generating a creation instruction in response to detecting a trigger on a multimedia conference interface;
    presenting by using a default display structure, in response to the creation instruction, a display area of a newly created file, wherein the display area is configured to display a newly created file for a multimedia conference, and a file content is edited by an object with editing authorization; and
    sharing the file content with another participant of the multimedia conference,
    wherein the generating a creation instruction in response to detecting a trigger on a multimedia conference interface comprises:
    generating the creation instruction in response to detecting a triggering operation on a creation control for the multimedia conference, wherein the creation control is presented in the conference process after the multimedia conference is started,
    wherein the creation control is arranged on an interface for selecting a content to be shared for the multimedia conference.

2. The method according to claim 1, wherein the method comprising:
    updating, based on an editing operation of the object with editing authorization, the file content being displayed in the display area.

3. The method according to claim 1, wherein the presenting, in response to the creation instruction, a display area of a newly created file comprises at least one of the following:
    determining a display structure of the display area based on a target type of the newly created file, and presenting the display area by using the determined display structure;
    presenting the display area by using a default display structure.

4. The method according to claim 3, wherein the target type is determined by the following determination steps:

displaying at least one file type in response to detecting a trigger operation on a creation control; and determining the target type of the newly created file based on a selection operation on the at least one file type.

5. The method according to claim 1, further comprising:
enabling an authorization control.

6. The method according to claim 5, wherein the authorization control comprises a file type selection control; and
the method further comprises:
displaying the file type selection control on a display interface.

7. The method according to claim 5, wherein the authorization control comprises a presentation authorization handover control; and
the method further comprises:
sending, in response to detecting a triggering operation on the presentation authorization handover control, a presentation authorization handover notification to a server based on a specified handover object identifier.

8. The method according to claim 5, wherein the authorization control comprises an editing authorization modification control; and
the method further comprises:
generating, in response to detecting a triggering operation on the editing authorization modification control, editing authorization information about the newly created file based on a modified editing authorization.

9. The method according to claim 5, wherein the authorization control comprises an editing control; and
the method further comprises:
updating the file content, in response to detecting a trigger operation on the editing control.

10. The method according to claim 1, further comprising:
determining a participant with viewing authorization based on specified viewing range indication information.

11. The method according to claim 1, wherein a server sends, in response to receiving the creation instruction, a creation notification to a participant with viewing authorization, wherein the creation instruction received by the server is sent by the participant in response to detecting a trigger operation on a creation control.

12. The method according to claim 1, wherein the presenting, in response to a creation instruction, a display area of a newly created file comprises:
presenting, in response to receiving the creation notification generated in response to the creation instruction, the display area of the newly created file indicated by the creation instruction.

13. The method according to claim 1, further comprising:
determining whether to enable an editing control based on an editing authorization specified by an initiator.

14. An interaction device, comprising:
at least one processor; and
at least one memory communicatively coupled to the at least one processor and storing instructions that upon execution by the at least one processor cause the apparatus to:
generate a creation instruction in response to detecting a triggering operation on a creation control for the multimedia conference;
present by using a default display structure, in response to the creation instruction, a display area of a newly created file indicated by the creation instruction, wherein the display area is configured to display a newly created file for a multimedia conference, and a file content is edited by an object with editing authorization; and
share the file content with another participant of the multimedia conference,
wherein generating a creation instruction in response to detecting a triggering operation on a creation control for the multimedia conference comprises:
generating the creation instruction in response to detecting a triggering operation on a creation control for the multimedia conference, wherein the creation control is presented in the conference process after the multimedia conference is started,
wherein the creation control is arranged on an interface for selecting a content to be shared for the multimedia conference.

15. A computer-readable non-transitory medium, comprising a computer program stored thereon, wherein the program, when executed by a computer, cause the computer to:
generate a creation instruction in response to detecting a triggering operation on a creation control for the multimedia conference;
present by using a default display structure, in response to the creation instruction, a display area of a newly created file indicated by the creation instruction, wherein the display area is configured to display a newly created file for a multimedia conference, and a file content is edited by an object with editing authorization;
share the file content with another participant of the multimedia conference; and
generate the creation instruction in response to detecting a triggering operation on a creation control for the multimedia conference, wherein the creation control is presented in the conference process after the multimedia conference is started,
wherein the creation control is arranged on an interface for selecting a content to be shared for the multimedia conference.

* * * * *